United States Patent
Um

(10) Patent No.: US 11,526,288 B2
(45) Date of Patent: Dec. 13, 2022

(54) MEMORY SYSTEM INCLUDING A PLURALITY OF MEMORY BLOCKS

(71) Applicant: SK hynix Inc., Gyeonggi-do (KR)

(72) Inventor: Gi Pyo Um, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 86 days.

(21) Appl. No.: 16/689,839

(22) Filed: Nov. 20, 2019

(65) Prior Publication Data
US 2021/0064241 A1 Mar. 4, 2021

(30) Foreign Application Priority Data
Aug. 29, 2019 (KR) .......................... 10-2019-0106747

(51) Int. Cl.
*G06F 3/06* (2006.01)
(52) U.S. Cl.
CPC ............ *G06F 3/064* (2013.01); *G06F 3/0604* (2013.01); *G06F 3/0653* (2013.01); *G06F 3/0679* (2013.01)
(58) Field of Classification Search
CPC ...... G06F 3/064; G06F 3/0604; G06F 3/0653; G06F 3/0679; G06F 3/0614; G06F 3/0685; G06F 12/0246; G06F 11/1441; G06F 11/1458; G06F 11/1469; G06F 2212/1016; G06F 2212/1024; G06F 2212/7202
See application file for complete search history.

(56) References Cited

U.S. PATENT DOCUMENTS

| 9,727,249 B1* | 8/2017 | Subramanian ......... G11C 16/10 |
| 2009/0198952 A1* | 8/2009 | Khmelnitsky ...... G06F 12/0246 711/206 |
| 2016/0188455 A1* | 6/2016 | Patel ................... G06F 12/0246 711/154 |
| 2017/0123718 A1* | 5/2017 | Sinha ..................... G06F 3/0653 |
| 2018/0189144 A1* | 7/2018 | Song ................... G06F 11/1441 |
| 2019/0065058 A1 | 2/2019 | Camp et al. |
| 2020/0278810 A1* | 9/2020 | Chang .................... G06F 3/061 |

FOREIGN PATENT DOCUMENTS

KR 10-2017-0044780 4/2017

\* cited by examiner

*Primary Examiner* — Reginald G Bragdon
*Assistant Examiner* — Curtis James Kortman
(74) *Attorney, Agent, or Firm* — IP & T Group LLP

(57) ABSTRACT

A memory system may include a memory device including a first memory block group and a second memory block group; and a memory controller configured to designate a first memory block of memory blocks included in the first memory block group as an open block and designate a second memory block of memory blocks included in the second memory block group as the open block, and perform a program operation on the first and second memory blocks designated as the open blocks. When the first memory block designated as the open block is changed to a closed block, the memory controller may determine whether to designate a third memory block among the memory blocks included in the first or the second memory block group as a new open block based on a number of times voltage abnormalities have occurred on a voltage supplied to the memory device.

17 Claims, 15 Drawing Sheets

MEMORY SYSTEM INCLUDING A PLURALITY OF MEMORY BLOCKS

CROSS-REFERENCE TO RELATED APPLICATION

The present application claims priority under 35 U.S.C. § 119(a) to Korean patent application number 10-2019-0106747 filed on Aug. 29, 2019, which is incorporated herein by reference in its entirety.

BACKGROUND

Field of Invention

Various embodiments of the present disclosure generally relate to a memory system, and more particularly, to a memory system including a plurality of memory blocks.

Description of Related Art

A memory system may include a memory device and a memory controller.

The memory controller may control the operation of the memory system in response to a request from a host. The memory device may store data or output the stored data, under control of the memory controller. For example, the memory device is formed of a volatile memory device in which data stored therein is lost when power supply is interrupted, or a nonvolatile memory device which can retain data stored therein even when power supply is interrupted.

SUMMARY

Various embodiments of the present disclosure may provide a memory system capable of adjusting the number of open blocks.

An embodiment of the present disclosure may provide for a memory system including a memory device including a first memory block group and a second memory block group; and a memory controller configured to designate a first memory block of memory blocks included in the first memory block group as an open block and designate a second memory block of memory blocks included in the second memory block group as the open block, and perform a program operation on the first and the second memory blocks designated as the open blocks. When the first memory block designated as the open block is changed to a closed block, the memory controller may determine whether to designate a third memory block among the memory blocks included in the first or the second memory block group as a new open block based on a number of times voltage abnormalities have occurred on a voltage supplied to the memory device.

An embodiment of the present disclosure may provide for an operating method of a controller for controlling a memory device including first and second groups of memory blocks, the operating method comprising designating one or more free blocks as open blocks within each of the first and second groups; and selectively designating, when one among the open blocks becomes a closed block within the first and second groups, an additional free block as an open block within the first and second groups according to a number of abnormalities of power supply to the memory device during a predetermined amount of time, wherein the memory device stores data into the open blocks.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
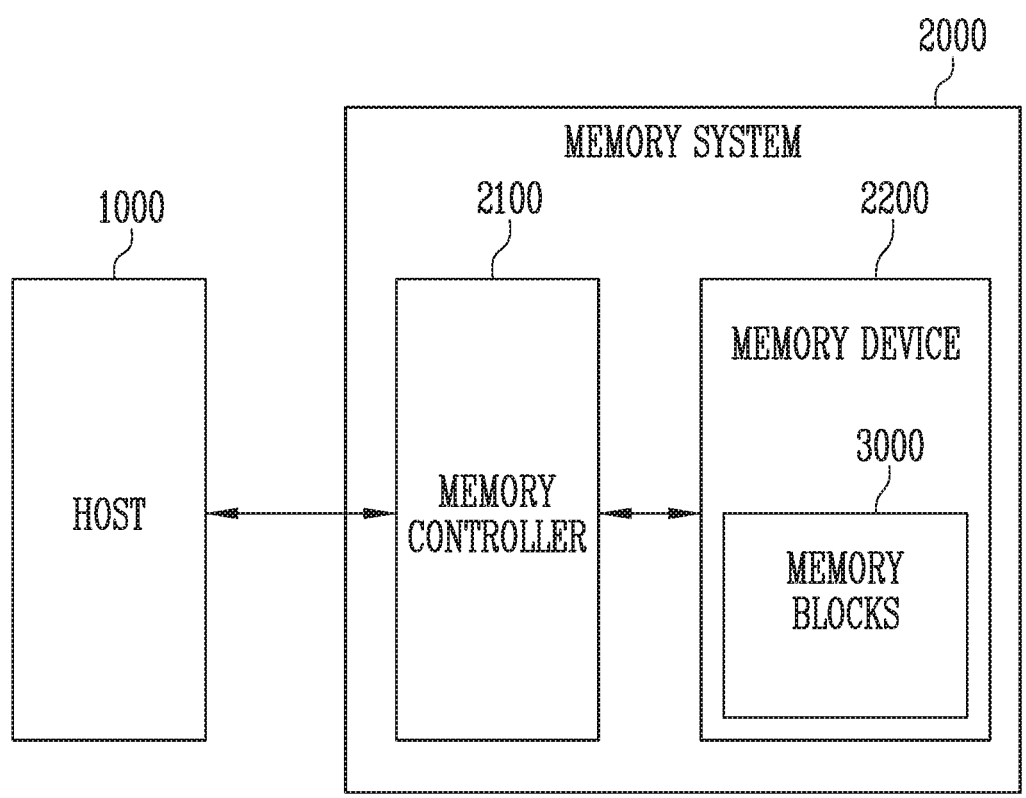
FIG. 1 is a diagram illustrating a memory system in accordance with an embodiment of the present disclosure.

FIG. 1 is a diagram illustrating a memory system 2000 in accordance with an embodiment of the present disclosure.

The memory system 2000 may include a memory device 2200 configured to store data, and a memory controller 2100 configured to control the memory device 2200 in response to a request rom a host 1000.

The host 1000 may be a device or system configured to store data in the memory system 2000 or retrieve the data from the memory system 2000. For example, the host 1000 may include at least one of a computer, a portable digital device, a tablet PC, a digital camera, a digital audio player, a television, a wireless communication device, or a cellular phone, but embodiments of the present disclosure are not limited thereto.

The memory controller 2100 may control the overall operation of the memory system 2000. The memory controller 2100 may perform various operations in response to requests from the host 1000. For instance, the memory controller 2100 may perform a program operation, a read operation, and an erase operation on the memory device 2200.

The memory controller 2100 may perform a garbage collection operation by self-determination thereof. For example, when the number of free blocks among memory blocks 3000 included in the memory device 2200 is less than a set number, the memory controller 2100 may perform an operation of reading valid page data among page data included in a closed block, and programming the read valid page data to an open block.

The memory controller 2100 may transmit, to control the operation of the memory device 2200, at least one of a command, an address or data to the memory device 2200.

The memory controller 2100 may designate any one memory block among the free blocks included in the memory blocks 3000 as an open block, and perform a program operation on the at least one memory block designated as an open block. If data is programmed to all pages of the memory block designated as an open block, in other words, if the memory block designated as an open block becomes a closed block, the memory controller 2100 may designate a new open block.

The memory controller 2100 may monitor a voltage to be supplied to the memory device 2200 and check whether voltage abnormality occurs on the voltage to be supplied to the memory device 2200. When voltage abnormality occurs on the voltage to be supplied to the memory device 2200 while data is programmed to an open block, the memory controller 2100 may perform a recovery operation of recovering data programmed to the open block. An occurrence of a "voltage abnormality" may mean that a voltage to be supplied to the memory device 2200 has been reduced below a first set value or increased over a second set value higher than the first set value. The cost required to perform the recovery operation may be proportional to the number of open blocks. Therefore, in the case where voltage abnormalities frequently occur, if the number of open blocks is reduced, the cost required to perform the recovery operation may be reduced.

For example, the memory controller 2100 may determine whether to designate a new open block based on the number of times voltage abnormalities have occurred on the voltage to be supplied to the memory device 2200. Detailed embodiments pertaining to this will be described later with reference to the associated drawings.

The memory device 2200 may perform at least one of a program operation, a read operation, or an erase operation under control of the memory controller 2100. For example, the memory device 2200 may receive a program command, an address, and data from the memory controller 2100, and store the data in response to the program command and the address. For example, the memory device 2200 may perform a read operation in response to a read command and an address received from the memory controller 2100, and provide read data to the memory controller 2100. For example, the memory device 2200 may perform an erase operation in response to an erase command and an address received from the memory controller 2100.

The memory device 2200 may be formed of a volatile memory device in which data stored therein is lost when power supply is interrupted, or a nonvolatile memory device which can retain data stored therein even when power supply is interrupted. The memory device 2200 may include a plurality of memory blocks 3000.

Figure 2:
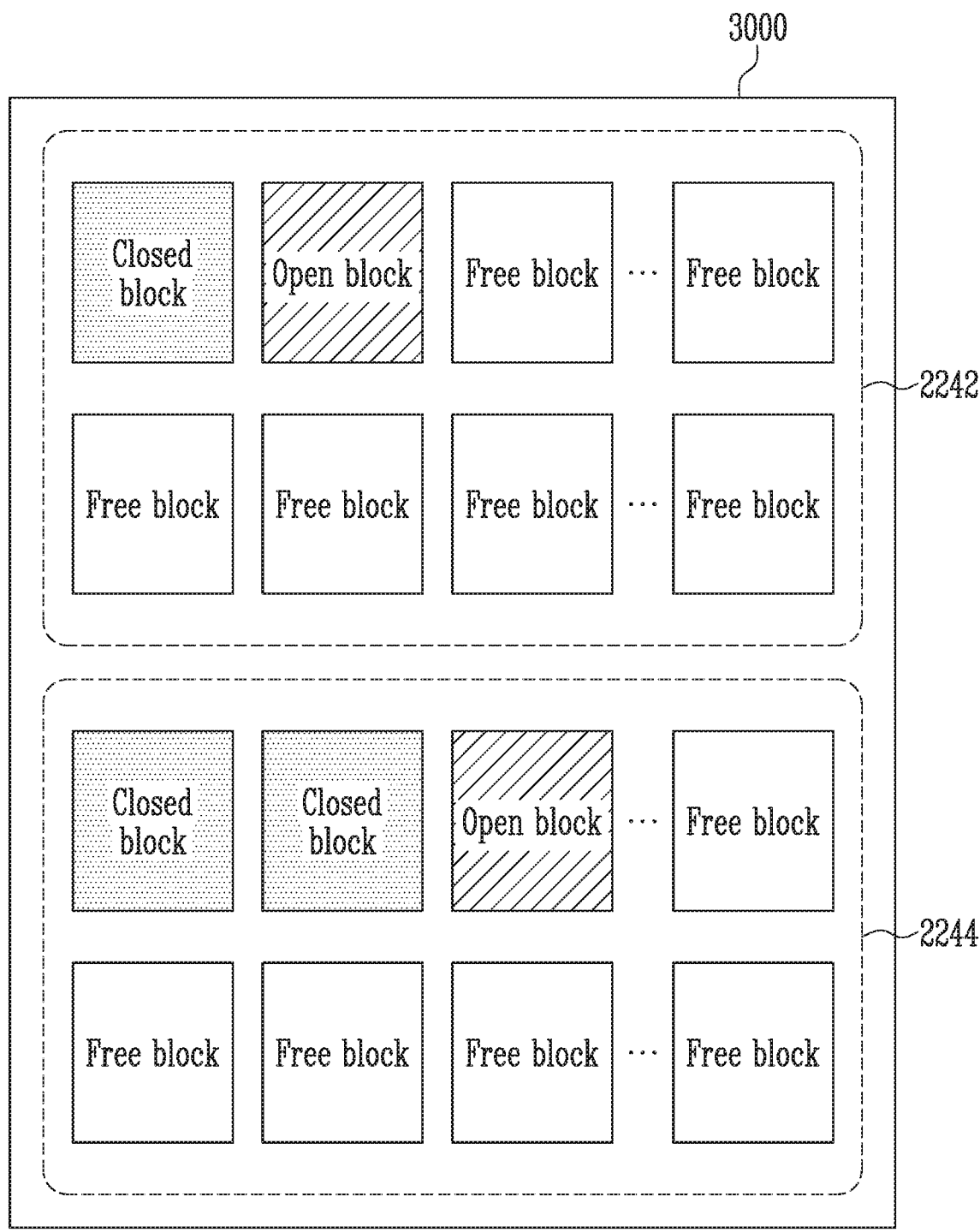
FIG. 2 is a diagram describing memory blocks illustrated in FIG. 1.

FIG. 2 is a diagram describing memory blocks, for example, the memory blocks illustrated in FIG. 1.

The memory blocks 3000 may include a first memory block group 2242 and a second memory block group 2244.

In an embodiment, all memory blocks that are included in the first memory block group 2242 and the second memory block group 2244 may be memory blocks in which p-bit data is stored in each cell. Here, p is a natural number.

For example, all of the memory blocks that are included in the first memory block group 2242 and the second memory block group 2244 may be single-level cell (SLC) memory blocks in which 1-bit data is stored in each cell. A logical page of data may be stored in each of physical pages included in each of the SLC blocks. A logical page of data may include data having a bit number corresponding to the number of memory cells included in one physical page.

For example, all of the memory blocks that are included in the first memory block group 2242 and the second memory block group 2244 may be multi-level cell (MLC) memory blocks, in which two or more bits of data are stored in each cell. For example, all of the memory blocks that are included in the first memory block group 2242 and the second memory block group 2244 may be 2-bit MLC memory blocks in which 2-bit data is stored in each cell, 3-bit MLC blocks (which may also be referred to as triple-level cell (TLC) blocks) in which 3-bit data is stored in each cell, or 4-bit MLC blocks (which may also be referred to as quad-level cell (QLC) blocks) in which 4-bit data is stored in each cell. Two logical pages of data may be stored in each of physical pages included in a 2-bit MLC block. Three logical pages of data may be stored in each of physical pages included in a 3-bit MLC block. Four logical pages of data may be stored in each of physical pages included in a 4-bit MLC block.

For example, at least one piece of data requested to be programmed from the host 1000 and metadata needed to perform an internal operation of the memory system 2000 may be stored in the memory blocks included in the first memory block group 2242. During a garbage collection operation valid page data included in a closed block may be stored in the memory blocks included in the second memory block group 2244.

In an embodiment, all of the memory cells included in the first memory block group 2242 may be memory blocks in which m-bit data is stored in each cell. All of the memory cells included in the second memory block group 2244 may be memory blocks in which n-bit data is stored in each cell. Here, m is a natural number, and n is a natural number greater than m.

For example, all of the memory cells included in the first memory block group 2242 may be SLC blocks. All of the memory cells included in the second memory block group 2244 may be MLC blocks.

For example, all of the memory cells included in the first memory block group 2242 may be 2-bit MLC blocks. All of the memory cells included in the second memory block group 2244 may be 3-bit MLC blocks or 4-bit MLC blocks.

For example, data requested to be programmed from the host 1000 may be stored in the memory blocks included in the first memory block group 2242. Metadata needed to perform an internal operation of the memory system 2000 may be stored in the memory blocks included in the second memory block group 2244.

On the contrary, all of the memory cells included in the first memory block group 2242 may be memory blocks in which n-bit data is stored in each cell. All of the memory cells included in the second memory block group 2244 may be memory blocks in which m-bit data is stored in each cell. Here, m is a natural number, and n is a natural number greater than m.

For example, all of the memory cells included in the first memory block group 2242 may be MLC blocks. All of the memory cells included in the second memory block group 2244 may be SLC blocks.

For example, all of the memory cells included in the first memory block group 2242 may be 3-bit MLC blocks or 4-bit MLC blocks. All of the memory cells included in the second memory block group 2244 may be 2-bit MLC blocks.

Each of the first memory block group 2242 and the second memory block group 2244 may include at least one free block. The free block may be a memory block which is not designated as an open block among memory blocks to which data has not been programmed.

Each of the first memory block group 2242 and the second memory block group 2244 may include at least one open block. The open block may be a memory block designated among free blocks to perform a program operation, and may be a memory block in which no data has been programmed to all pages or data has been programmed to only some of the pages. In other words, the open block may be a memory block on which a program operation is not yet performed, a memory block designated to perform a program operation, or a memory block on which a program operation is being performed.

Each of the first memory block group 2242 and the second memory block group 2244 may include at least one closed block. The closed block may be a memory block in which data has been programmed to all pages.

The memory controller 2100 may retain a plurality of open block in the case where voltage abnormalities do not frequently occur. For example, the memory controller 2100 may retain at least one open block in the first memory block group 2242, and retain at least one open block in the second memory block group 2244.

In the case where voltage abnormalities frequently occur, the number of open blocks that are retained by the memory controller 2100 may be reduced compared to that of the case where voltage abnormalities do not frequently occur.

Figure 3:
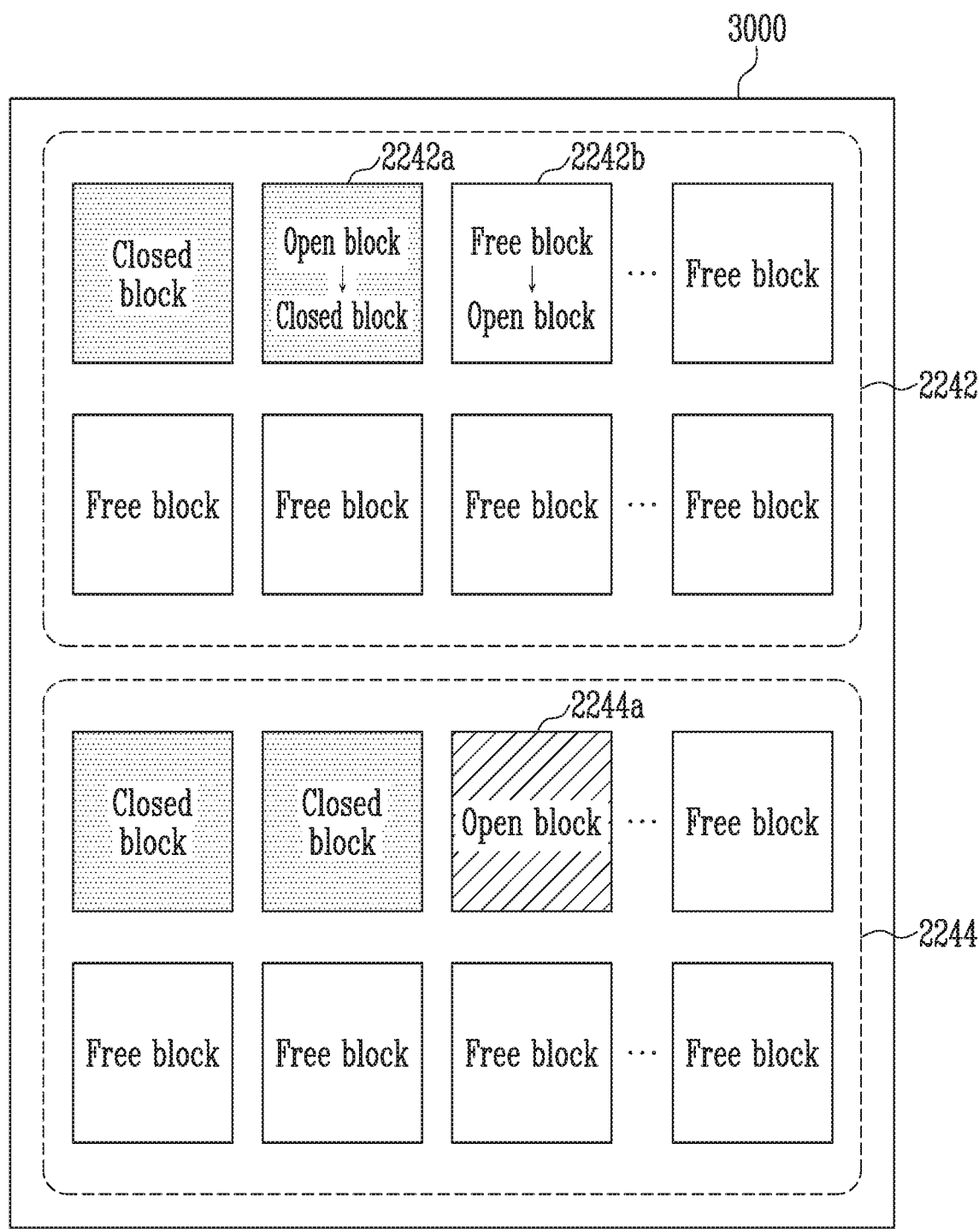
FIG. 3 is a diagram describing a method of designating an open block in accordance with an embodiment of the present disclosure.

FIG. 3 is a diagram describing a method of designating an open block in accordance with an embodiment of the present disclosure.

In an embodiment to be described below with reference to FIG. 3, it is assumed that a memory block 2242*a* included in the first memory block group 2242 and a memory block 2244*a* included in the second memory block group 2244 are designated as open blocks.

In some embodiments, a plurality of memory blocks among memory blocks included in the first memory block group 2242 may be designated as open blocks. Also, a plurality of memory blocks among memory blocks included in the second memory block group 2244 may be designated as open blocks.

The memory controller 2100 may perform a program operation on the memory blocks 2242*a* and 2244*a* that are designated as open blocks.

In the case where any one of the memory blocks 2242*a* and 2244*a* designated as open blocks becomes a closed block, the memory controller 2100 may determine whether to designate a new open block. For example, FIG. 3 illustrates the case where the memory block 2242*a* among the memory blocks included in the first memory block group 2242 is changed from an open block to a closed block.

In the case where the memory block 2242*a* is changed from an open block to a closed block, the memory controller 2100 may determine whether to designate a new open block based on the number of times voltage abnormalities have occurred in the memory device 2200. For example, the memory controller 2100 may determine whether to designate a new open block based on the number of times voltage abnormalities have occurred in the memory device 2200, for example, whether the number of times exceeds a first threshold value.

In an embodiment, the memory controller 2100 may determine the number of times voltage abnormalities have occurred in the memory device 2200 with reference to information indicating the time each voltage abnormality occurs. For example, with reference to the information indicating the time each voltage abnormality occurs in the memory device 2200. For example, the memory controller 2100 may determine the number of times voltage abnormalities have occurred in the memory device 2200 during a preset time period ending when the memory block 2242*a* becomes a closed block. A detailed example pertaining to this will be described later with reference to FIG. 5.

In an embodiment, the memory controller 2100 may determine the number of times voltage abnormalities have occurred in the memory device 2200 based on the number of dummy physical pages included in the memory block 2242*a* that has been changed from an open block to a closed block. For example, the memory controller 2100 may determine the number of dummy physical pages included in the memory block 2242*a* to be the number of times voltage abnormalities have occurred in the memory device 2200. A detailed example pertaining to this will be described later with reference to FIG. 6.

In an embodiment, the memory controller 2100 may determine whether to designate a new open block based on the number of times voltage abnormalities have occurred in the memory device 2200.

In an embodiment, the memory controller 2100 may not designate a new open block when the number of times voltage abnormalities have occurred in the memory device 2200 exceeds a first threshold value. Therefore, in the case of FIG. 3, only the memory block 2244*a* included in the second memory block group 224 may be retained as an open block.

In an embodiment, in the case where the number of times voltage abnormalities have occurred in the memory device 2200 exceeds the first threshold value, the memory controller 2100 may determine whether to designate a new open block, taking into account whether a memory block designated as an open block exists among the memory blocks 3000.

In an embodiment, in the case where the number of times voltage abnormalities have occurred in the memory device 2200 exceeds the first threshold value and a memory block designated as an open block exists among the memory blocks 3000, the memory controller 2100 may not designate a new open block. For example, as illustrated in FIG. 3, in the case where the memory block 2244*a* included in the second memory block group 2244 is designated as an open block, the memory controller 2100 may not designate a new open block.

In an embodiment, in the case where the number of times voltage abnormalities have occurred in the memory device 2200 exceeds the first threshold value and a memory block designated as an open block does not exist among the memory blocks 3000, the memory controller 2100 may designate a new open block. For example, in the embodiment illustrated in FIG. 3, if the memory block 2244a included in the second memory block group 2244 had already become a closed block before the memory controller 2100 makes the determination whether to designate a new open block, the memory controller 2100 may designate a new open block.

For instance, in the case where all of the memory blocks that are included in the first memory block group 2242 and the second memory block group 2244 are SLC blocks or q-bit MLC blocks, the memory controller 2100 may designate any one of the memory blocks included in the first memory block group 2242 as an open block or designate any one of the memory blocks included in the second memory block group 2244 as an open block. Here, q is a natural number of 2 or more.

For example, in the case where the memory blocks included in the first memory block group 2242 are memory blocks in which m-bit data is stored in each cell and the memory blocks included in the second memory block group 2244 are memory blocks in which n-bit data is stored in each cell instead of in the first memory block group 2242, the memory controller 2100 may designate one of the memory blocks included in the second memory block group 2244 as a new open block for storage of data. Here, m is a natural number, and n is a natural number greater than m.

For example, in the case where the memory blocks included in the first memory block group 2242 are memory blocks in which n-bit data is stored in each cell and the memory blocks included in the second memory block group 2244 are memory blocks in which m-bit data is stored in each cell instead of in the first memory block group 2242, the memory controller 2100 may designate one of the memory blocks included in the first memory block group 2242 as a new open block for storage of data. Here, m is a natural number, and n is a natural number greater than m.

In an embodiment, in the case where the number of times voltage abnormalities have occurred in the memory device 2200 is equal to or less than the first threshold value, the memory controller 2100 may designate any one of the memory blocks included in the first memory block group 2242 as a new open block. For example, as illustrated in FIG. 3, the memory controller 2100 may designate the memory block 2242b among the memory blocks included in the first memory block group 2242 as a new open block.

In an embodiment, in the case where the number of times voltage abnormalities have occurred in the memory device 2200 is equal to or less than the first threshold value, the memory controller 2100 may determine whether to designate a new open block, taking into account any one of a ratio of the number of free blocks included in the first memory block group 2242 to the number of all memory blocks included in the first memory block group 2242 and whether a memory block designated as an open block exists among the memory blocks included in the second memory block group 2244.

For example, in the case where the ratio of the number of free blocks included in the first memory block group 2242 is equal to or greater than a second threshold value, the memory controller 2100 may designate the memory block 2242b included in the first memory block group 2242 as a new open block.

For example, in the case where the ratio of the number of free blocks included in the first memory block group 2242 is less than the second threshold value and a memory block designated as an open block exists among the memory blocks included in the second memory block group 2244, the memory controller 2100 may not designate a new open block.

Figure 4:
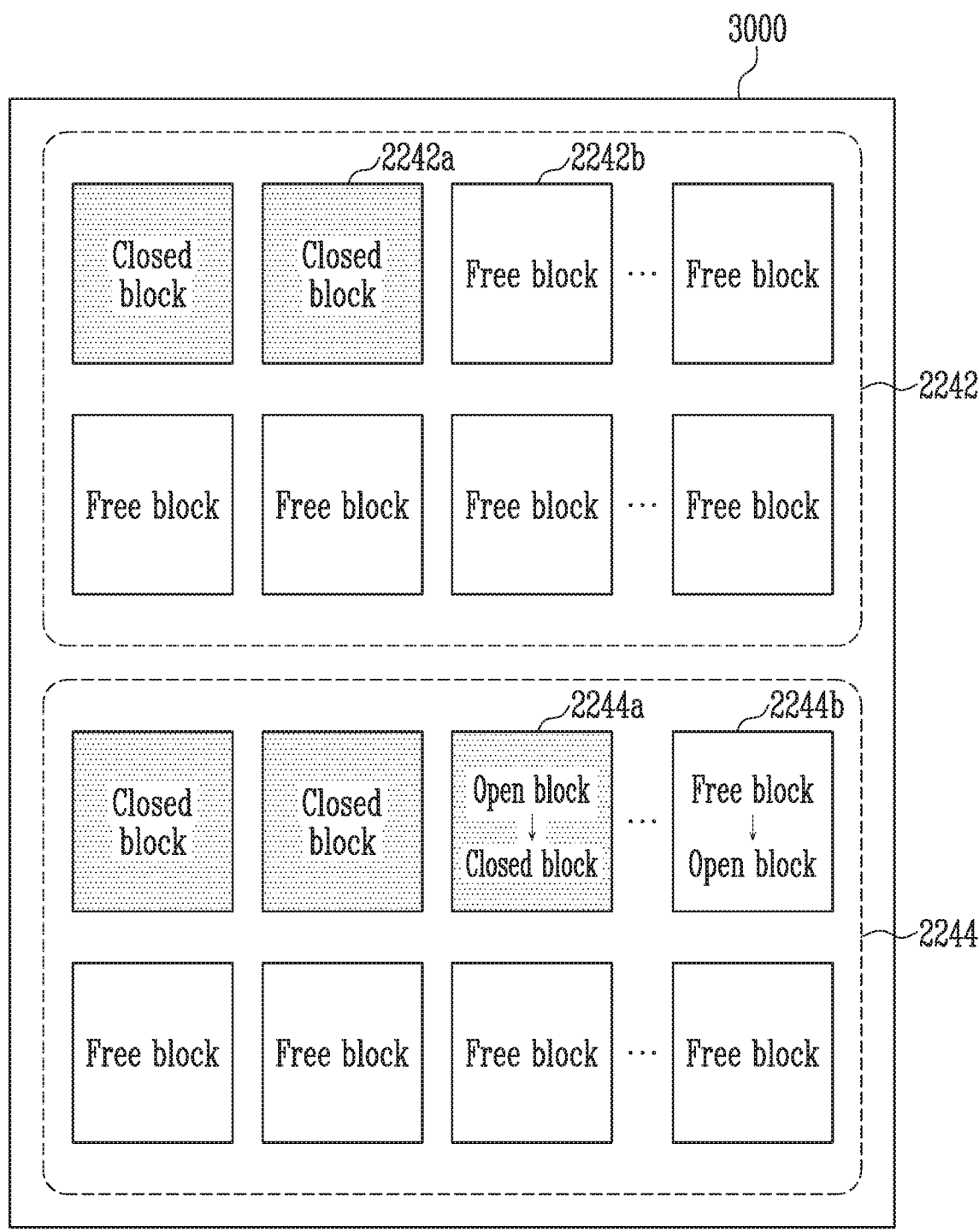
FIG. 4 is a diagram describing a method of designating an open block in accordance with an embodiment of the present disclosure.

FIG. 4 is a diagram describing a method of designating an open block in accordance with an embodiment of the present disclosure.

In an embodiment to be described below with reference to FIG. 4, it is assumed that, after a memory block 2242a included in the first memory block group 2242 becomes a closed block, no memory block included in the first memory block group 2242 is designated as a new open block. In other words, it is assumed that only the memory block 2244a among the memory blocks 3000 is designated as an open block.

In an embodiment, in the case where the memory block 2244a included in the second memory block group 2244 is changed from an open block to a closed block, the memory controller 2100 may designate any one memory block, for example memory block 2244b among the memory blocks included in the second memory block group 2244, as a new open block.

In an embodiment, in the case where the memory block 2244b included in the second memory block group 2244 is designated as a new open block, the memory controller 2100 may determine the number of times voltage abnormalities have occurred in the memory device 2200 and determine whether to designate an additional new open block among the memory blocks included in the first memory block group 2242 based on the determined number of times.

For example, in the case where the number of times voltage abnormalities have occurred in the memory device 2200 is equal to or less than the first threshold value and a memory block designated as an open block does not exist among the memory blocks included in the first memory block group 2242, the memory controller 2100 may determine whether to designate any one of the memory blocks included in the first memory block group 2242 as an additional new open block, taking into account a ratio of the number of free blocks included in the first memory block group 2242 to the number of memory blocks included in the first memory block group 2242.

For example, the memory controller 2100 may determine a ratio of the number of free blocks included in the first memory block group 2242 to the number of all memory blocks included in the first memory block group 2242 at a time point at which the memory block 2244a included in the second memory block group 2244 is changed from an open block to a closed block. When the determined ratio is equal to or greater than the second threshold value, the memory controller 2100 may designate any one memory block 2242b among the memory blocks included in the first memory block group 2242 as an additional new open block. When the determined ratio is less than the second threshold value, the memory controller 2100 may not designate an additional new open block.

In an embodiment, in the case where the memory block 2244a included in the second memory block group 2244 is changed from an open block to a closed block, even when the number of times voltage abnormalities have occurred in the memory device 2200 exceeds the first threshold value, the memory controller 2100 may designate a new open block within any one between the first and second memory block groups 2242 and 2244 if a memory block designated as an open block does not exist among the memory blocks included in the first memory block group 2242.

For example, in the case where the memory blocks included in the first memory block group 2242 are memory blocks in which m-bit data is stored in each cell and the memory blocks included in the second memory block group 2244 are memory blocks in which n-bit data is stored in each cell, the memory controller 2100 may designate one of the memory blocks included in the second memory block group 2244 as a new open block. Here, m and n may be different natural numbers. In an embodiment, n is a natural number greater than m.

For example, in the case where the memory blocks included in the first memory block group 2242 are memory blocks in which n-bit data is stored in each cell and the memory blocks included in the second memory block group 2244 are memory blocks in which m-bit data is stored in each cell, the memory controller 2100 may designate one of the memory blocks included in the first memory block group 2242 as a new open block. Here, m and n may be different natural numbers. In an embodiment, n is a natural number greater than m.

Figure 5:
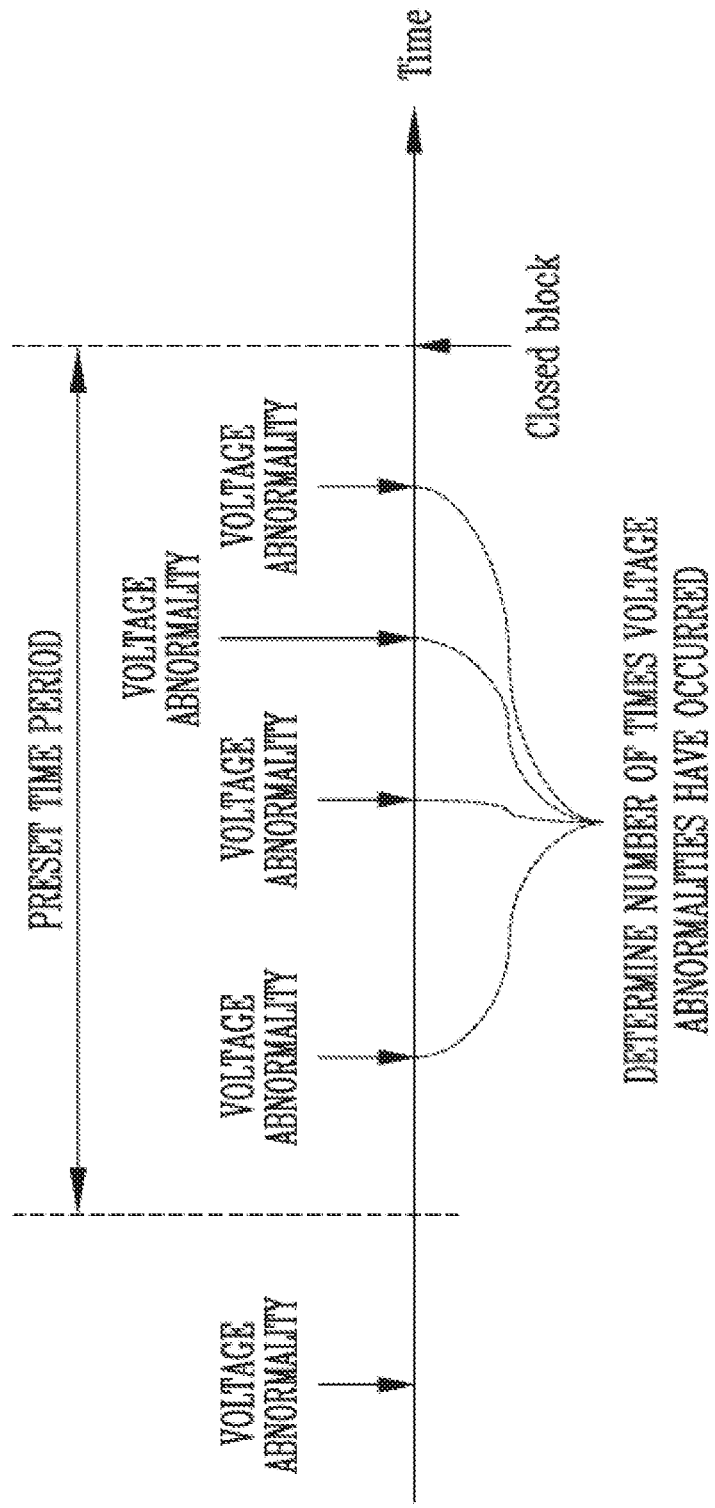
FIG. 5 is a diagram describing an example of calculating the number of times voltage abnormalities have occurred in accordance with an embodiment of the present disclosure.

FIG. 5 is a diagram describing an example of calculating the number of times voltage abnormalities have occurred in the memory device 2200 in accordance with an embodiment of the present disclosure.

Each time a voltage abnormality occurs when supplying voltage to the memory device 2200, the memory controller 2100 may generate information indicating the time the voltage abnormality occurs in the memory device 2200.

When any one of the memory blocks is changed from an open block to a closed block, the memory controller 2100 may determine the number of times voltage abnormalities have occurred in the memory device 2200 with reference to the information indicating the time each voltage abnormality occurs in the memory device 2200. For example, with reference to the information indicating the time each voltage abnormality occurs in the memory device 2200, the memory controller 2100 may determine the number of times voltage abnormalities have occurred in the memory device 2200 during a preset time period ending when any one of the memory blocks is changed from an open block to a closed block.

Figure 6:
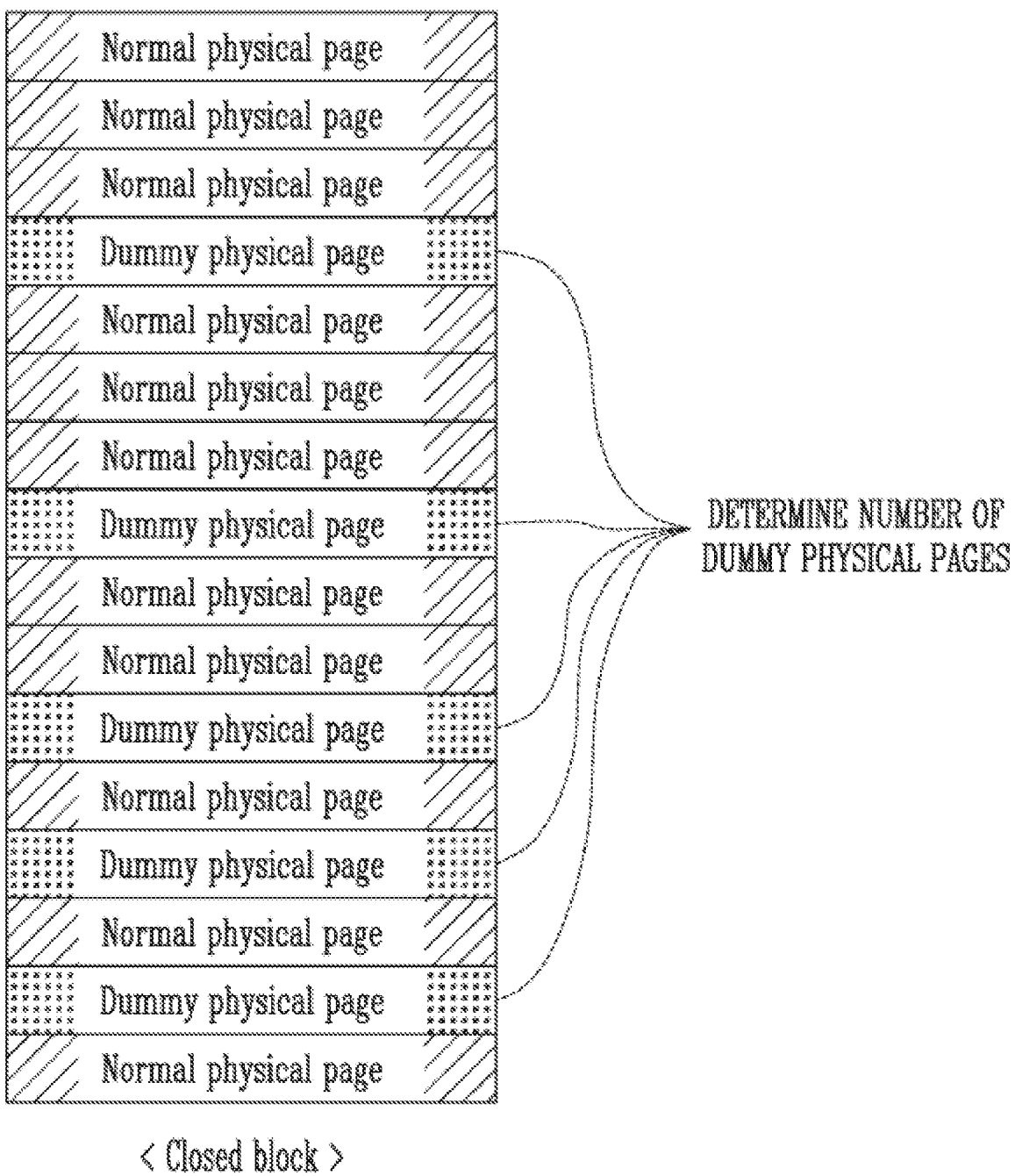
FIG. 6 is a diagram describing an example of calculating the number of times voltage abnormalities have occurred in accordance with an embodiment of the present disclosure.

FIG. 6 is a diagram describing an example of calculating the number of times voltage abnormality has occurred in the memory device 2200 in accordance with an embodiment of the present disclosure.

When a voltage abnormality is detected in the memory device 2200 while a program operation is performed on a memory block designated as an open block, the memory controller 2100 may program dummy data to a physical page on which the program operation is being performed. In an embodiment illustrated in FIG. 6, "Normal physical page" refers to a physical page on which program-requested data has been programmed. "Dummy physical page" refers to a physical page on which dummy data has been programmed.

When any one of the memory blocks is changed from an open block to a closed block, the memory controller 2100 may determine the number of dummy physical pages included in the memory block that is changed to the closed block, and determine that number to be the number of times voltage abnormalities have occurred in the memory device 2200.

In an embodiment, each time dummy data is programmed to a physical page of a memory block designated as an open block, the memory controller 2100 may update the number of times dummy data has been programmed in the corresponding memory block, and retain information about the updated number of times. Therefore, the number of dummy physical pages included in the memory block that is changed to a closed block may be determined by checking the information about the updated number of times corresponding to the memory block that is changed to a closed block.

In an embodiment, the memory device 2200 may include a flag cell corresponding to each physical page. The memory controller 2100 may program, to a first set value, e.g., '1', a flag cell corresponding to a physical page to which dummy data is programmed, and may program, to a second set value, e.g., '0', a flag cell corresponding to a physical page to which program-requested data is programmed. Hence, the number of dummy physical pages included in the memory block that is changed to a closed block may be determined by checking the number of flag cells programmed to the first set value, e.g., '1' among flag cells included in the memory block that is changed to a closed block.

Figure 7:
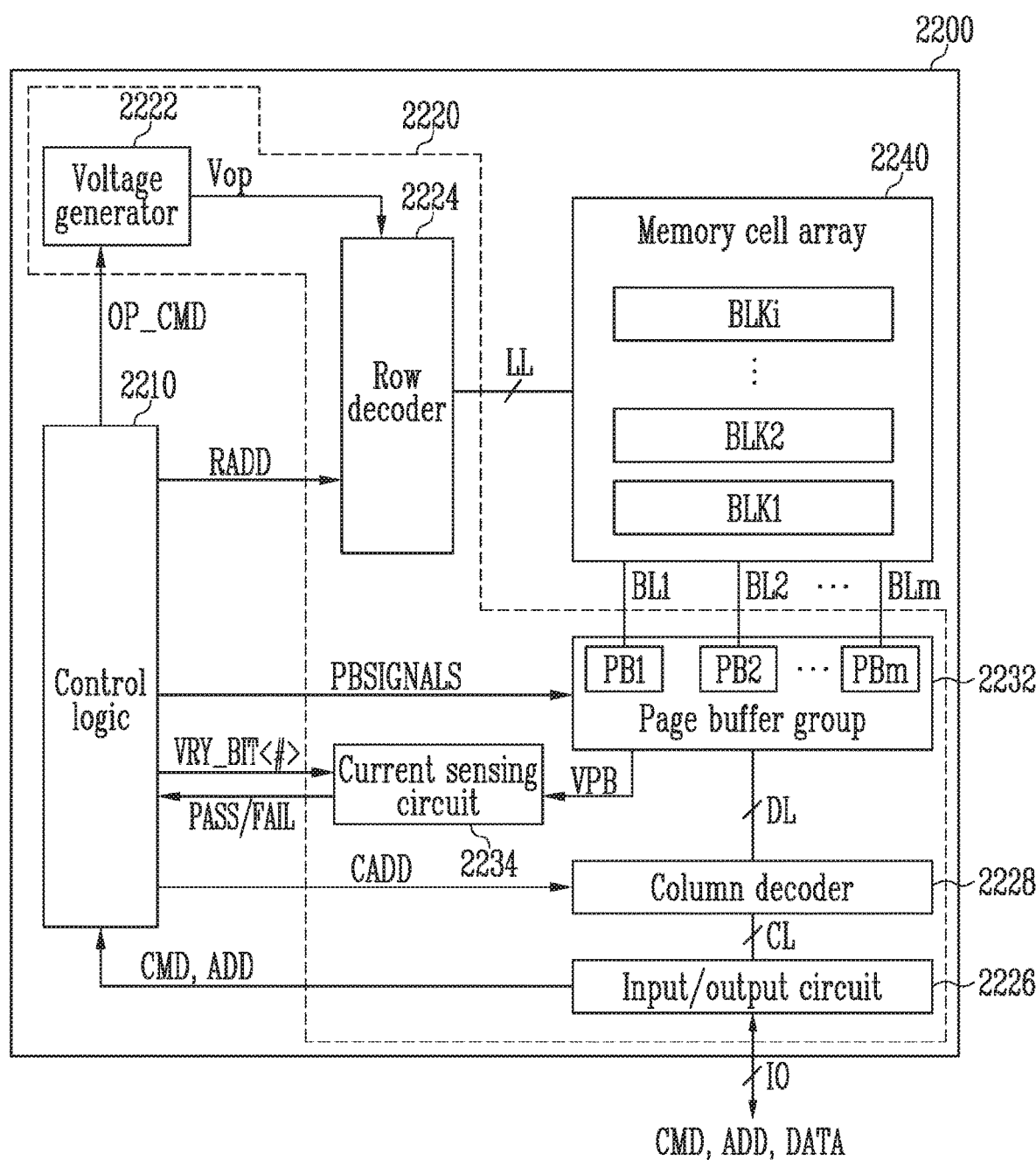
FIG. 7 is a diagram describing a memory device illustrated in FIG. 1.

FIG. 7 is a diagram describing a memory device 2200 illustrated in FIG. 1.

The memory device 2200 may include a control logic 2210, peripheral circuits 2210, and a memory cell array 2240.

The control logic 2210 may control the peripheral circuits 2220 under control of the memory controller 2100.

The control logic 2210 may control the peripheral circuits 2220 in response to a command CMD and an address ADD which are received from the memory controller 2100 through the input/output circuit 2226. For example, the control logic 2210 may output an operating signal OP_CMD, a row address RADD, a column address CADD, page buffer control signals PBSIGNALS, and an enable bit VRY_BIT<#> in response to the command CMD and the address ADD. The control logic 2210 may determine whether a verify operation has passed or failed, in response to a pass signal PASS or a fail signal FAIL received from the current sensing circuit 2234.

The peripheral circuits 2220 may perform a program operation for storing data in the memory cell array 2240, a read operation for outputting the data stored in the memory cell array 2240, or an erase operation for erasing the data stored in the memory cell array 2240.

The peripheral circuits 2220 may include a voltage generator 2222, a row decoder 2224, an input/output circuit 2226, a column decoder 2228, a page buffer group 2232, and a current sensing circuit 2234.

The voltage generator 2222 may generate various operating voltages Vop to be used for the program operation, the read operation, or the erase operation in response to an operating signal OP_CMD received from the control logic 2210. For example, the voltage generator 2222 may transmit a program voltage, a verify voltage, a pass voltage, a read voltage, an erase voltage, a turn-on voltage, etc. to the row decoder 2224.

The row decoder 2224 may transmit, in response to a row address RADD received from the control logic 2210, operating voltages Vop to local lines LL coupled to a selected one of the memory blocks included in the memory cell array 2240. The local lines LL may include local word lines, local drain select lines, and local source select lines. In addition, the local lines LL may include various lines such as source lines coupled to the memory blocks.

The input/output circuit 2226 may transmit, to the control logic 2210, a command CMD and an address ADD received from the memory controller through input/output lines JO, or may exchange data DATA with the column decoder 2228.

The column decoder 2228 may transmit data between the input/output circuit 2226 and the page buffer group 2232 in response to a column address CADD received from the control logic 2210. For example, the column decoder 2228 may exchange data with page buffers PB1 to PBm through data lines DL or exchange data with the input/output circuit 2226 through column lines CL.

The page buffer group 2232 may be coupled to the bit lines BL1 to BLm coupled in common to the memory blocks BLK1 to BLKi. The page buffer group 2232 may include the plurality of page buffers PB1 to PBm coupled to the bit lines BL1 to BLm. For example, a single page buffer may be coupled to each bit line. The page buffers PB1 to PBm may operate in response to page buffer control signals PBSIG-NALS received from the control logic 2210. For example, during a program operation, the page buffers PB1 to PBm may temporarily store program data received from the memory controller, and adjust voltages to be applied to the bit lines BL1 to BLm according to the program data. Furthermore, during a read operation, the page buffers PB1 to PBm may temporarily store data received through the bit lines BL1 to BLm or sense voltages or current of the bit lines BL1 to BLm.

During a read operation or a verify operation, the current sensing circuit 2234 may generate a reference current in response to an enable bit VRY_BIT<#> received from the control logic 2210, and may compare a sensing voltage VPB received from the page buffer group 2232 with a reference voltage generated by the reference current and output a pass signal PASS or a fail signal FAIL.

The memory cell array 2240 may include a plurality of memory blocks BLK1 to BLKi configured to store data. User data and various information needed for operations of the nonvolatile memory device 2200 may be stored in the memory blocks BLK1 to BLKi. The memory blocks BLK1 to BLKi may be embodied in a two-dimensional structure or a three-dimensional structure, and have the same configuration.

The memory blocks BLK1 to BLKi may be the memory blocks 3000 described with reference to FIGS. 1 to 4.

Figure 8:
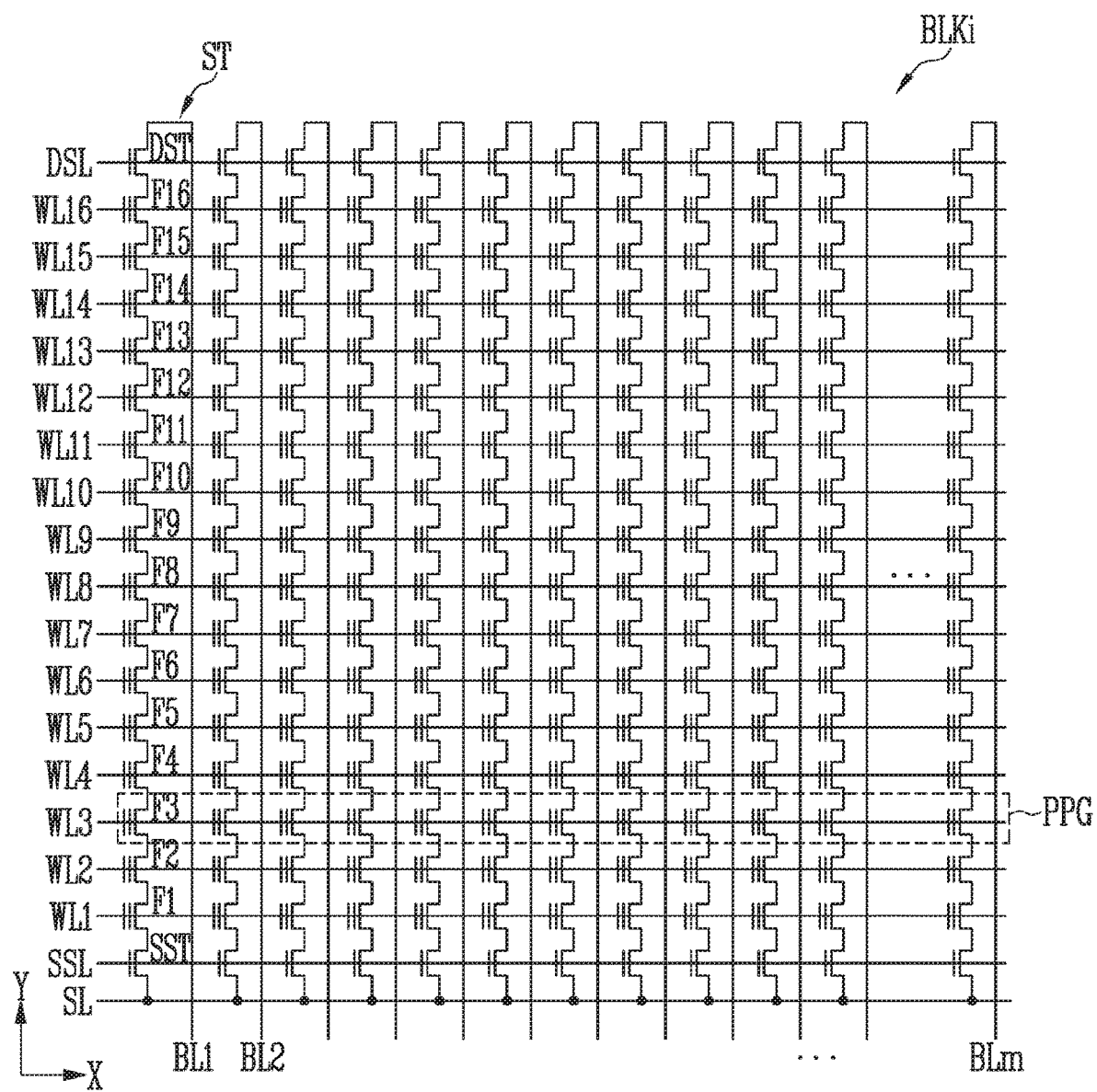
FIG. 8 is a diagram illustrating a memory block in accordance with an embodiment of the present disclosure.

FIG. 8 is a diagram illustrating a memory block in accordance with an embodiment of the present disclosure.

The memory cell array 2240 may include a plurality of memory blocks. For the sake of explanation, FIG. 8 illustrates any one memory block BLKi of the plurality of memory blocks BLK1 to BLKi illustrated in FIG. 7.

In the memory block BLKi, a plurality of word lines arranged parallel to each other may be coupled between a first select line and a second select line. Here, the first select line may be a source select line SSL, and the second select line may be a drain select line DSL. In more detail, the memory block BLKi may include a plurality of strings ST coupled between the bit lines BL1 to BLm and the source line SL. The bit lines BL1 to BLm may be respectively coupled to the strings ST, and the source line SL may be coupled in common to the strings ST. The strings ST may have the same configuration; therefore, the string ST that is coupled to the first bit line BL1 will be described in detail by way of example.

The string ST may include a source select transistor SST, a plurality of memory cells F1 to F16, and a drain select transistor DST which are coupled in series to each other between the source line SL and the first bit line BL1. At least one source select transistor SST and at least one drain select transistor DST may be included in each string ST, and a larger number of memory cells than the number of memory cells F1 to F16 shown in the drawing may be included in each string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells F1 to F16 may be coupled to the plurality of word lines WL1 to WL16. Among the memory cells included in different strings ST, a group of memory cells coupled to each word line may be referred to as a physical page PPG. Therefore, the number of physical pages PPG included in the memory block BLKi may correspond to the number of word lines WL1 to WL16.

Figure 9:
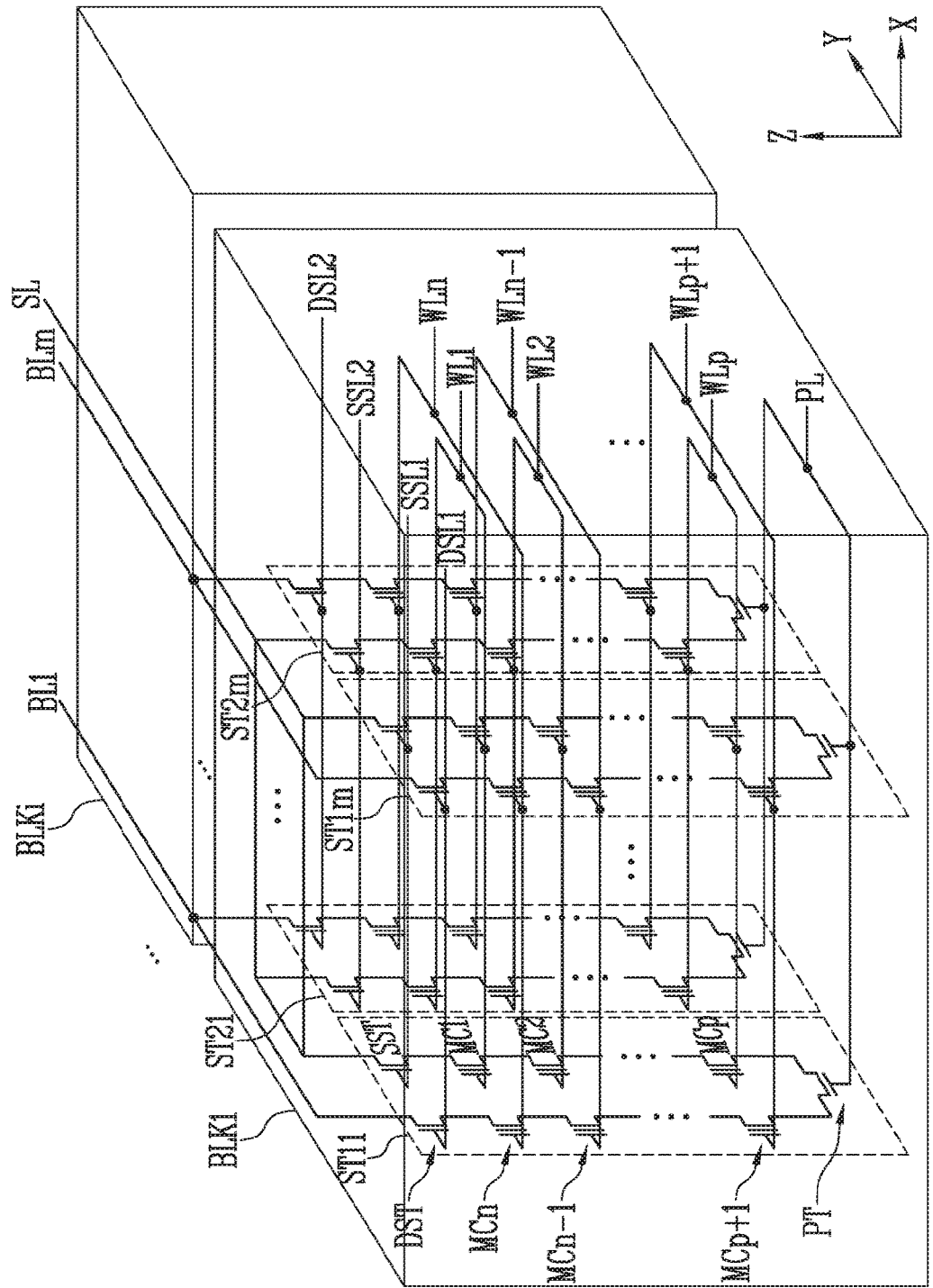
FIG. 9 is a diagram illustrating a memory block having a three-dimensional structure in accordance with an embodiment of the present disclosure.

FIG. 9 is a diagram illustrating a memory block having a three-dimensional structure in accordance with an embodiment of the present disclosure.

The memory cell array 2240 may include a plurality of memory blocks BLK1 to BLKi. The first memory block BLK1 will be described by way of example. The first memory block BLK1 may include a plurality of strings ST11 to ST1m and ST21 to ST2m. In an embodiment, each of the strings ST11 to ST1m and ST21 to ST2m may be formed in a 'U' shape. In the first memory block BLK1, m strings may be arranged in a row direction (i.e. an X direction). Although FIG. 9 illustrates that two strings are arranged in a column direction (i.e., a Y direction) as an example, the present disclosure is not limited thereto. For example, three or more strings may be arranged in the column direction (the Y direction).

Each of the strings ST11 to ST1m and ST21 to ST2m may include at least one source select transistor SST, first to n-th memory cells MC1 to MCn, a pipe transistor PT, and at least one drain select transistor DST.

The source select transistor SST, the drain select transistor DST and the memory cells MC1 to MCn may have structures similar to each other. For example, each of the source select transistor SST, the drain select transistor DST and the memory cells MC1 to MCn may include a channel layer, a tunnel insulating layer, a charge trap layer, and a blocking insulating layer. For example, a pillar for providing the channel layer may be provided in each string. For instance, a pillar for providing at least one of the channel layer, the tunnel insulating layer, the charge trap layer, or the blocking insulating layer may be provided in each string.

The source select transistor SST of each string may be coupled between the source line SL and the memory cells MC1 to MCp.

In an embodiment, source select transistors of strings arranged in the same row may be coupled to a source select line extending in the row direction. Source select transistors of strings arranged in different rows may be coupled to different source select lines. In FIG. 9, source select transistors of the strings ST11 to ST1m in a first row may be coupled to a first source select line SSL1. Source select transistors of the strings ST21 to ST2m in a second row may be coupled to a second source select line SSL2.

In an embodiment, the source select transistors of the strings ST11 to ST1m and ST21 to ST2m may be coupled in common to a single source select line.

The first to n-th memory cells MC1 to MCn in each string may be coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp may be successively arranged in a vertical direction (i.e., in a Z direction) and coupled in series to each other between the source select transistor SST and the pipe transistor PT. The p+1-th to n-th memory cells MCp+1 to MCn may be successively arranged in the vertical direction (the Z direction) and coupled in series to each other between the pipe transistor PT and the drain select transistor DST. The first to p-th memory cells MC1 to MCp and the p+1-th to n-th memory cells MCp+1 to MCn may be coupled to each other through the pipe transistor PT. Gates of the first to n-th memory cells MC1 to MCn of each string may be respectively coupled to first to n-th word lines WL1 to WLn.

In an embodiment, at least one of the first to n-th memory cells MC1 to MCn may be used as a dummy memory cell. In the case where the dummy memory cell is provided, the voltage or the current of the corresponding string may be stably controlled. Gates of the pipe transistors PT of the respective strings may be coupled to a pipeline PL.

The drain select transistor DST of each string may be coupled between the corresponding bit line and the memory cells MCp+1 to MCn. Strings arranged in the row direction may be coupled to corresponding drain select lines extending in the row direction. The drain select transistors of the strings ST11 to ST1m in the first row may be coupled to a first drain select line DSL1. The drain select transistors of the strings ST21 to ST2m in the second row may be coupled to a second drain select line DSL2.

Strings arranged in the column direction may be coupled to corresponding bit lines extending in the column direction. In FIG. 9, the strings ST11 and ST21 in a first column may be coupled to a first bit line BL1. The strings Slim and ST2m in an m-th column may be coupled to an m-th bit line BLm.

Among the strings arranged in the row direction, memory cells coupled to the same word line may form one page. For example, memory cells coupled to the first word line WL1 in the strings ST11 to Slim of the first row may form a single page. Memory cells coupled to the first word line WL1 in the strings ST21 to ST2m of the second row may form another single page. When any one of the drain select lines DSL1 and DSL2 is selected, strings arranged in the corresponding row may be selected. When any one of the word lines WL1 to WLn is selected, a corresponding single page may be selected from the selected strings.

Figure 10:
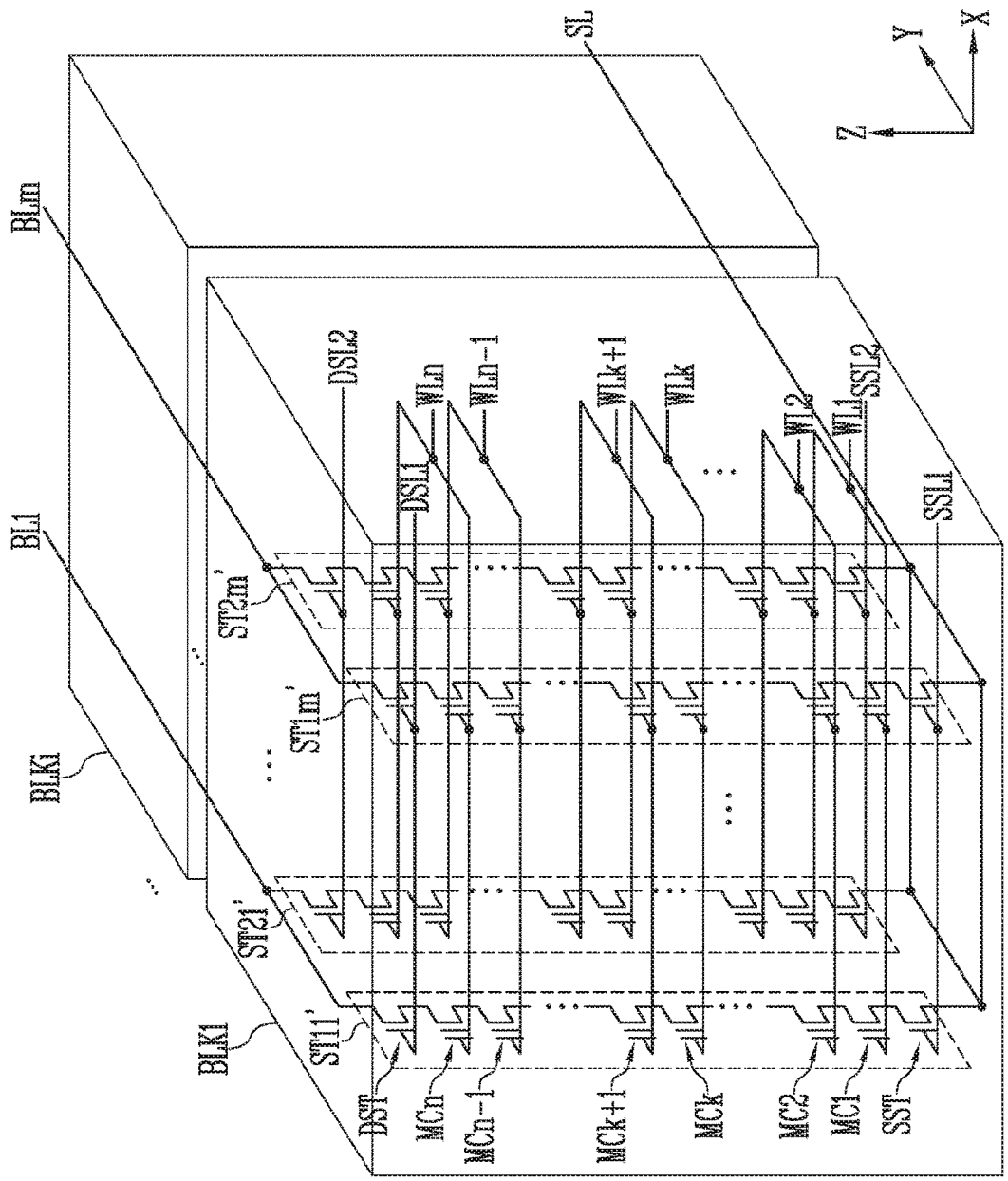
FIG. 10 is a diagram illustrating a memory block having a three-dimensional structure in accordance with an embodiment of the present disclosure.

FIG. 10 is a diagram illustrating a memory block having a three-dimensional structure in accordance with an embodiment of the present disclosure.

The memory cell array 2240 may include a plurality of memory blocks BLK1 to BLKi. The first memory block BLK1 will be described by way of example. The first memory block BLK1 may include a plurality of strings ST11' to ST1m' and ST21' to ST2m'. Each of the strings ST11' to ST1m' and ST21' to ST2m' may extend in a vertical direction (i.e., in a Z direction). In each memory block BLKi, m' strings may be arranged in a row direction (i.e., in an X direction). Although FIG. 10 illustrates that two strings are arranged in a column direction (i.e., in a Y direction), this is only for the sake of explanation. For example, three or more strings may be arranged in the column direction (the Y direction).

Each of the strings ST11' to ST1m' and ST21' to ST2m' may include at least one source select transistor SST, first to n-th memory cells MC1 to MCn, and at least one drain select transistor DST.

The source select transistor SST of each string may be coupled between the source line SL and the memory cells MC1 to MCn. Source select transistors of strings arranged in the same row may be coupled to the same source select line. The source select transistors of the strings ST11' to ST1m' arranged in a first row may be coupled to a first source select line SSL1. The source select transistors of the strings ST21' to ST2m' arranged in a second row may be coupled to a second source select line SSL2. In an embodiment, the source select transistors of the strings ST11' to ST1m' and ST21' to ST2m' may be coupled in common to a single source select line.

The first to n-th memory cells MC1 to MCn in each string may be coupled in series between the source select transistor SST and the drain select transistor DST. Gates of the first to n-th memory cells MC1 to MCn may be respectively coupled to first to n-th word lines WL1 to WLn.

In an embodiment, at least one of the first to n-th memory cells MC1 to MCn may be used as a dummy memory cell. In the case where the dummy memory cell is provided, the voltage or the current of the corresponding string may be stably controlled. Thereby, the reliability of data stored in the first memory block BLK1 may be improved.

The drain select transistor DST of each string may be coupled between the corresponding bit line and the memory cells MC1 to MCn. Drain select transistors DST of strings arranged in the row direction may be coupled to corresponding drain select lines extending in the row direction. The drain select transistors DST of the strings ST11' to ST1m' in the first row may be coupled to a first drain select line DSL1. The drain select transistors DST of the strings ST21' to ST2m' in the second row may be coupled to a second drain select line DSL2.

In other words, the first memory block BLK1 of FIG. 10 may have an equivalent circuit similar to that of the first memory block BLK1 of FIG. 9 except that a pipe transistor PT is excluded from each cell string.

Figure 11:
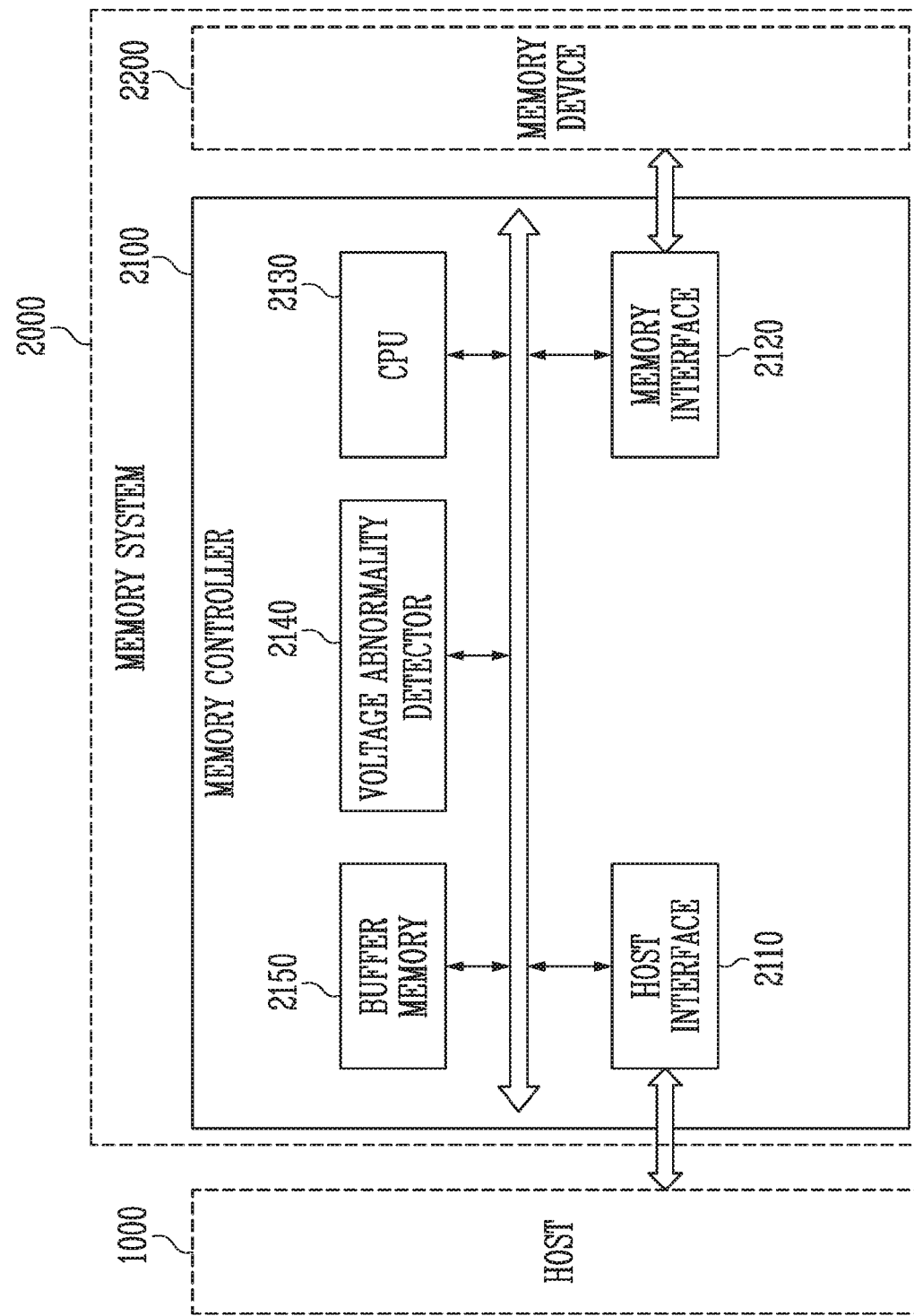
FIG. 11 is a diagram for describing a memory controller illustrated in FIG. 1.

FIG. 11 is a diagram describing a memory controller 2100 illustrated in FIG. 1.

The memory controller 2100 may include a host interface 2110, a memory interface 2120, a central processing unit (CPU) 2130, a voltage abnormality detector 2140, and a buffer memory 2150. The host interface 2110, the memory interface 2120, the voltage abnormality detector 2140, and the buffer memory 2150 may be controlled by the central processing unit 2130.

The host interface 2110 may perform communication with the host 1000 using various interface protocols. For example, the host interface 2110 may communicate with the host 1000 using at least one of various interface protocols such as a non-volatile memory express (NVMe) protocol, a peripheral component interconnection-express (PCI-E) protocol, an advanced technology attachment (ATA) protocol, a serial ATA (SATA) protocol, a parallel ATA (PATA) protocol, a universal serial bus (USB) protocol, a multimedia card (MMC) protocol, an enhanced small disk interface (ESDI) protocol, an integrated drive electronics (IDE) protocol, a mobile industry processor interface (MIPI) protocol, a universal flash storage (UFS) protocol, a small computer system interface (SCSI) protocol, or a serial attached SCSI (SAS) protocol. However, embodiments of the present disclosure are not limited to the above described examples.

The memory interface 2120 may communicate with the memory device 2200 using various interface protocols.

The central processing unit 2130 may perform various operations or generate a command and an address so as to control the memory device 2200. For example, the central processing unit 2130 may generate various commands and addresses required for a program operation, a read operation, or an erase operation in response to a request from the host interface 2110, and output the generated commands and addresses to the memory device 2200.

The central processing unit 2130 may perform a garbage collection operation by self-determination, and may generate a command and an address required for the garbage collection operation and output the command and the address to the memory device 2200.

The central processing unit 2130 may manage an open block. For example, when any one of the memory blocks is changed from an open block to a closed block, the central processing unit 2130 may perform an operation of designating a new open block or an additional new open block based on the number of times voltage abnormalities have occurred in the memory device 2200, as described with reference to FIGS. 1 to 6.

The voltage abnormality detector 2140 may monitor a voltage to be supplied to the memory device 2200, and may generate, each time a voltage abnormality occurs on the voltage to be supplied to the memory device 2200, information indicating the time the voltage abnormality occurs, and provide the generated information to the central processing unit 2130.

The buffer memory 2150 may be a temporary memory device configured to temporarily store data while the memory controller 2100 controls the memory device 2200.

The buffer memory 2150 may be used as a storage for storing various information needed for the operation of the memory controller 2100. The buffer memory 2150 may store a plurality of tables. In an embodiment, an address mapping table in which logical addresses and physical addresses are mapped may be loaded on the buffer memory 2150.

Figure 12:
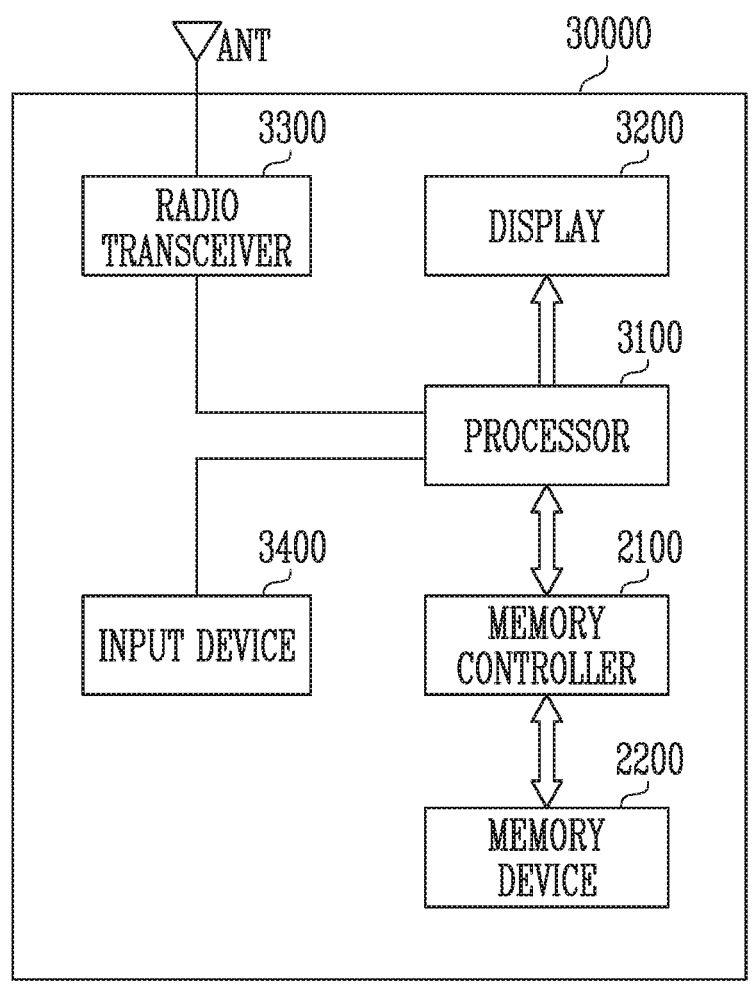
FIG. 12 is a diagram illustrating an example of a memory system including the memory controller illustrated in FIGS. 1 and 11.

FIG. 12 is a diagram illustrating an example of a memory system 30000 including the memory controller illustrated in FIGS. 1 and 11.

Referring to FIG. 12, the memory system 30000 may be embodied in a cellular phone, a smartphone, a tablet personal computer (PC), a personal digital assistant (PDA) or a wireless communication device. The memory system 30000 may include a memory device 2200 and a memory controller 2100 configured to control the operation of the memory device 2200.

The memory controller 2100 may control a data access operation, e.g., a program operation, an erase operation, or a read operation, of the memory device 2200 under control of a processor 3100.

Data programmed in the memory device 2200 may be outputted through a display 3200 under control of the memory controller 2100.

A radio transceiver 3300 may send and receive radio signals through an antenna ANT. For example, the radio transceiver 3300 may change a radio signal received through the antenna ANT into a signal capable of being processed in the processor 3100. Therefore, the processor 3100 may process a signal outputted from the radio transceiver 3300 and transmit the processed signal to the memory controller 2100 or the display 3200. The memory controller 2100 may transmit a signal processed by the processor 3100 to the memory device 2200. Furthermore, the radio transceiver 3300 may change a signal outputted from the processor 3100 into a radio signal, and output the changed radio signal to an external device through the antenna ANT. An input device 3400 may be used to input a control signal for controlling the operation of the processor 3100 or data to be processed by the processor 3100. The input device 3400 may be embodied in a pointing device such as a touch pad and a computer mouse, a keypad or a keyboard. The processor 3100 may control the operation of the display 3200 such that data outputted from the memory controller 2100, data outputted from the radio transceiver 3300, or data outputted form the input device 3400 is outputted through the display 3200.

In an embodiment, the memory controller 2100 capable of controlling the operation of the memory device 2200 may be embodied as a part of the processor 3100 or a chip provided separately from the processor 3100.

Figure 13:
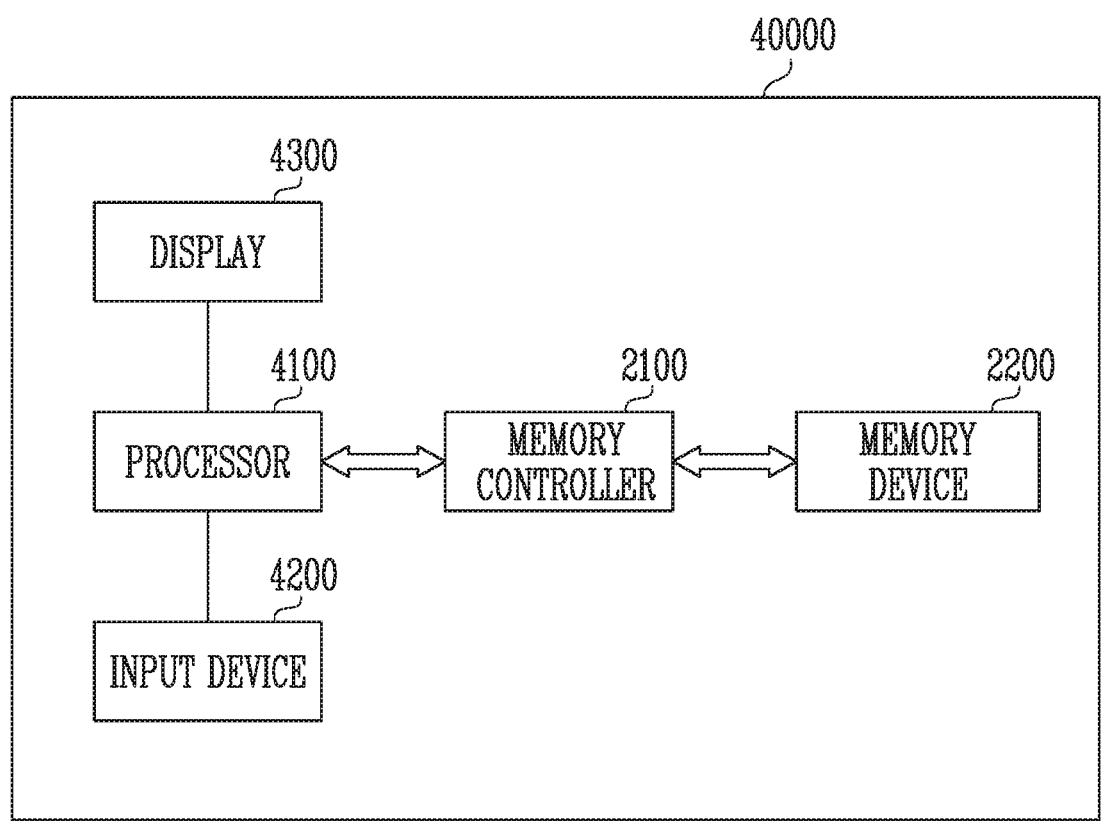
FIG. 13 is a diagram illustrating an example of a memory system including the memory controller illustrated in FIGS. 1 and 11.

FIG. 13 is a diagram illustrating an example of a memory system 40000 including the memory controller illustrated in FIGS. 1 and 11.

Referring to FIG. 13, the memory system 40000 may be embodied in a personal computer (PC), a tablet PC, a net-book, an e-reader, a personal digital assistant (PDA), a portable multimedia player (PMP), an MP3 player, or an MP4 player.

The memory system 40000 may include a memory device 2200, and a memory controller 2100 configured to control a data processing operation of the memory device 2200.

A processor 4100 may output data stored in the memory device 2200 through a display 4300, according to data input from an input device 4200. For example, the input device 4200 may be embodied in a pointing device such as a touch pad or a computer mouse, a keypad, or a keyboard.

The processor 4100 may control the overall operation of the memory system 40000 and control the operation of the memory controller 2100. In an embodiment, the memory controller 2100 capable of controlling the operation of the memory device 2200 may be embodied as a part of the processor 4100 or a chip provided separately from the processor 4100.

Figure 14:
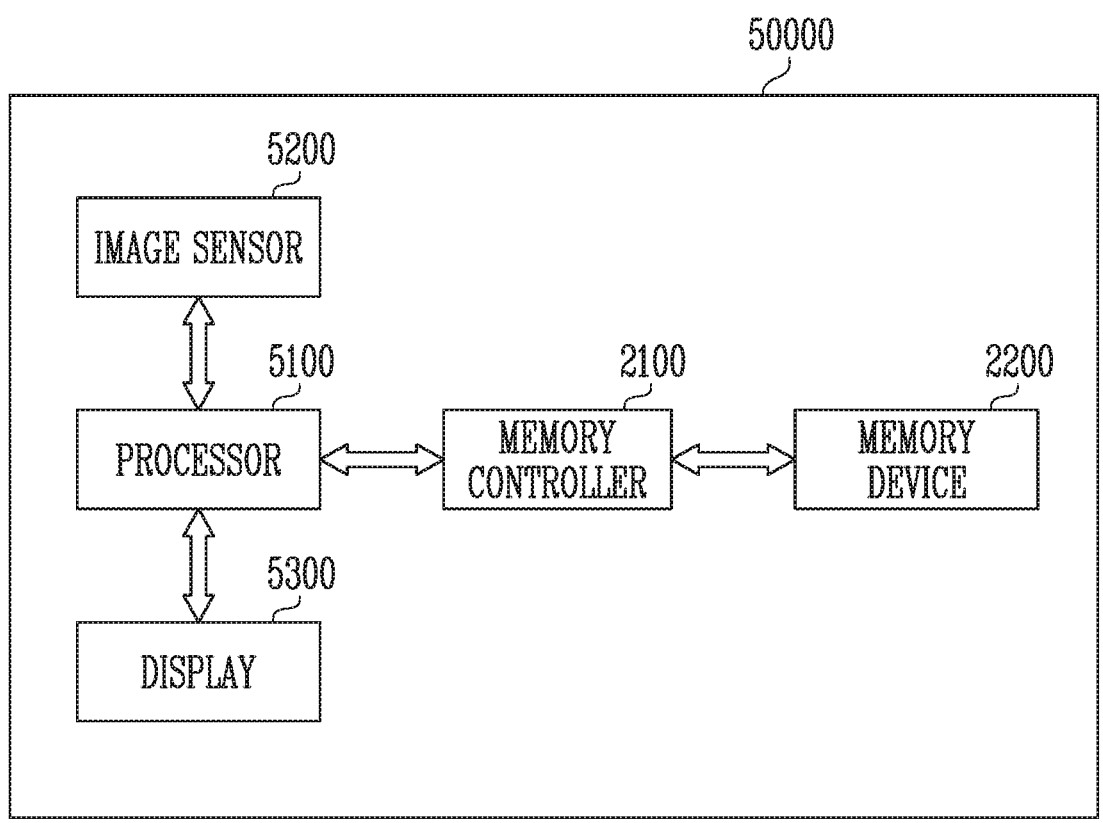
FIG. 14 is a diagram illustrating an example of a memory system including the memory controller illustrated in FIGS. 1 and 11.

FIG. 14 is a diagram illustrating an example of a memory system 50000 including the memory controller illustrated in FIGS. 1 and 11.

Referring to FIG. 14, the memory system 50000 may be embodied in an image processing device, e.g., a digital camera, a portable phone provided with a digital camera, a smartphone provided with a digital camera, or a tablet PC provided with a digital camera.

The memory system 50000 may include a memory device 2200, and a memory controller 2100 configured to control a data processing operation, e.g., a program operation, an erase operation, or a read operation, of the memory device 2200.

An image sensor 5200 of the memory system 50000 may convert an optical image into digital signals. The converted digital signals may be transmitted to a processor 5100 or the memory controller 2100. Under control of the processor 5100, the converted digital signals may be outputted through a display 5300 or stored to the memory device 2200 through the memory controller 2100. Data stored in the memory device 2200 may be outputted through the display 5300 under control of the processor 5100 or the memory controller 2100.

In an embodiment, the memory controller 2100 capable of controlling the operation of the memory device 2200 may be embodied as a part of the processor 5100 or a chip provided separately from the processor 5100.

Figure 15:
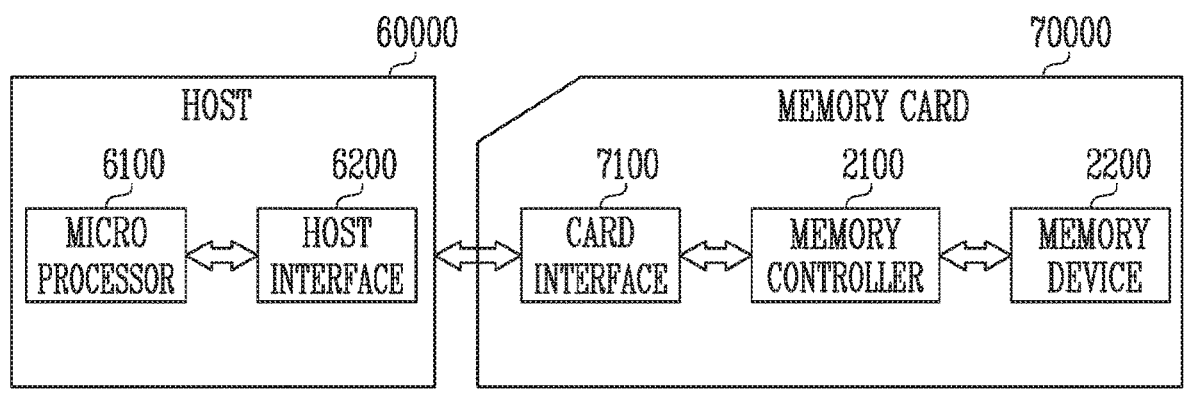
FIG. 15 is a diagram illustrating an example of a memory system including the memory controller illustrated in FIGS. 1 and 11.

FIG. 15 is a diagram illustrating an example of a memory system 70000 including the memory controller illustrated in FIGS. 1 and 11.

Referring to FIG. 15, the memory system 70000 may be embodied in a memory card or a smart card. The memory system 70000 may include a memory device 2200, a memory controller 2100, and a card interface 7100.

The controller 2100 may control data exchange between the memory device 2200 and the card interface 7100. In an embodiment, the card interface 7100 may be a secure digital (SD) card interface or a multi-media card (MMC) interface, but the present disclosure is not limited thereto.

The card interface 7100 may interface data exchange between a host 60000 and the memory controller 2100 according to a protocol of the host 60000. In an embodiment, the card interface 7100 may support a universal serial bus (USB) protocol, and an interchip (IC)-USB protocol. Here, the card interface 7100 may refer to hardware capable of supporting a protocol which is used by the host 60000, software installed in the hardware, or a signal transmission method.

When the memory system 70000 is connected to a host interface 6200 of the host 60000 such as a PC, a tablet PC, a digital camera, a digital audio player, a cellular phone, console video game hardware or a digital set-top box, the host interface 6200 may perform data communication with the memory device 2200 through the card interface 7100 and the memory controller 2100 under control of a microprocessor 6100.

In accordance with the present disclosure, recovery cost required when voltage abnormality occurs may be reduced.

What is claimed is:

1. A memory system comprising:
a memory device including a first memory block group for storing m-bit data (m is a natural number) per cell and a second memory block group for storing n-bit data (n is a natural number different from m) per cell; and
a memory controller configured to:
designate a first memory block of memory blocks included in the first memory block group as a first open block,
designate a second memory block of memory blocks included in the second memory block group as a second open block,
perform a program operation on the first open block and the second open block, respectively,
in response to changing the first open block to a closed block, count a number of times voltage abnormalities, in a voltage supplied to the memory device, have occurred during a predetermined time, and
when the counted number of times voltage abnormalities have occurred exceeds a first threshold value, determine whether to designate a third memory block, included in the first memory block group or the second memory block group, as a new open block, based on whether at least one open memory block exists among the memory blocks included in the first memory block group and the memory blocks included in the second memory block group.

2. The memory system according to claim 1, wherein the memory controller determines a number of dummy physical pages included in the first memory block changed to the closed block, and determines the counted number of times the voltage abnormalities have occurred based on the determined number of dummy physical pages.

3. The memory system according to claim 1, wherein, the third memory block is included in the first memory block group.

4. The memory system according to claim 3, wherein, when the opened memory block exists among the memory blocks included in the first memory block group and the memory blocks included in the second memory block group, the memory controller does not designate the third memory block as the new open block.

5. The memory system according to claim 3, wherein, when the opened memory block does not exist among the memory blocks included in the first memory block group and the memory blocks included in the second memory block group, the memory controller designates the third memory block as the new open block.

6. The memory system according to claim 5, wherein the memory device is configured to store the m-bit data per cell in the memory blocks included in the first memory block group, and the n-bit data per cell in the memory blocks included in the second memory block group, where n is greater than m.

7. The memory system according to claim 5, wherein the memory device is configured to store the m-bit data per cell in the memory blocks included in the first memory block group, and the n-bit data per cell in the memory blocks included in the second memory block group, where n is less than m.

8. The memory system according to claim 1, wherein, when the counted number of times the voltage abnormalities have occurred is equal to or less than the first threshold value, the memory controller designates the third memory block as the new open block, wherein the third memory block is included in the first memory block group.

9. The memory system according to claim 8, wherein, when an opened memory block does not exist among the memory blocks included in the second memory block group, the memory controller determines whether to designate a fourth memory block among the memory blocks included in the second memory block group as an additional new open block.

10. The memory system according to claim 9, wherein the memory controller further determines whether to designate the fourth memory block as the additional new open block, based on a ratio of a number of free blocks included in the second memory block group to a number of all memory blocks included in the second memory block group.

11. The memory system according to claim 10, wherein the memory controller designates the fourth memory block as the additional new open block when the ratio is equal to or greater than a second threshold value, and
wherein the memory controller does not designate the fourth memory block as the additional new open block when the ratio is less than the second threshold value.

12. The memory system according to claim 1, wherein, when the counted number of times the voltage abnormalities have occurred is equal to or less than the first threshold value, the memory controller further determines whether to designate the third memory block as the new open block, based on a ratio of a number of free blocks included in the first memory block group to a number of all memory blocks included in the first memory block group, or based on whether an opened memory block exists among the memory blocks included in the second memory block group.

13. The memory system according to claim 12, wherein, when the ratio is equal to or greater than a second threshold value, the memory controller designates the third memory block as the new open block, and wherein the third memory block is included in the first memory block group.

14. The memory system according to claim 12, wherein, when the ratio is less than a second threshold value and the opened memory block exists among the memory blocks included in the second memory block group, the memory controller does not designate the third memory block as the new open block.

15. The memory system according to claim 1, wherein, when the counted number of times the voltage abnormalities have occurred exceeds the first threshold value and an opened memory block does not exist among the memory blocks included in the second memory block group, the memory controller designates the third memory block as the new open block.

16. The memory system according to claim 15, wherein the memory device is configured to store the m-bit data per cell in the memory blocks included in the first memory block group, and the n-bit data per cell in the memory blocks included in the second memory block group, wherein n is greater than m.

17. The memory system according to claim 15, wherein the memory device is configured to store the m-bit data per cell in the memory blocks included in the first memory block group, and the n-bit data per cell in the memory blocks included in the second memory block group, wherein n is less than m.

* * * * *